Figure 1:
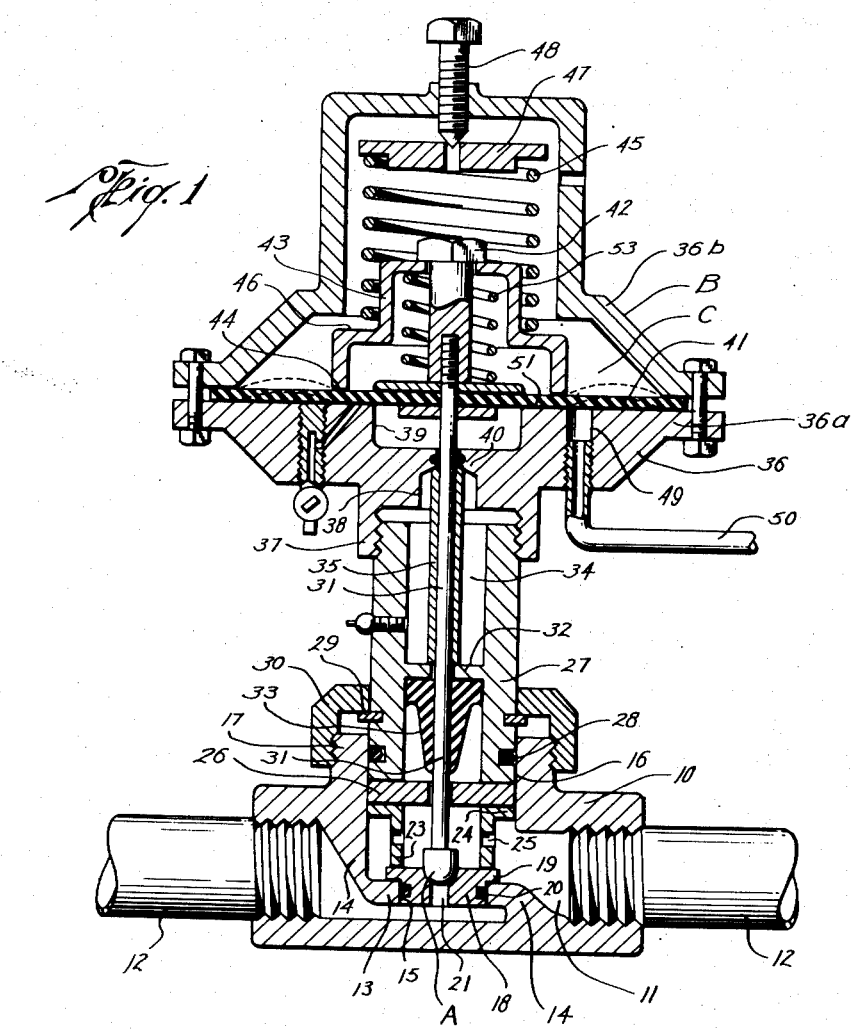

Jan. 12, 1954   A. S. PARKS   2,665,711
FLUID MOTOR VALVE
Filed Nov. 30, 1951   3 Sheets-Sheet 1

Asbury S. Parks
INVENTOR.

BY J. Vincent Martin
and
Joe E. Edwards
ATTORNEYS

Jan. 12, 1954

A. S. PARKS 2,665,711

FLUID MOTOR VALVE

Filed Nov. 30, 1951

3 Sheets-Sheet 2

Asbury S. Parks
INVENTOR.

BY J. Vincent Martin
and
Joel E. Edwards
ATTORNEYS

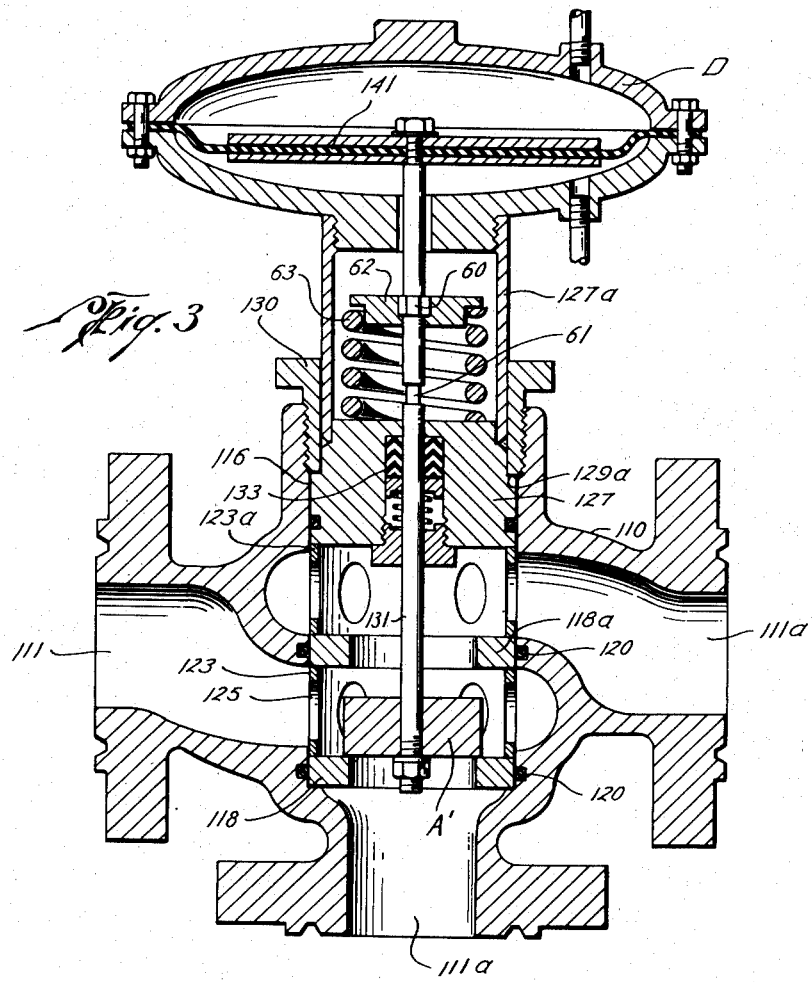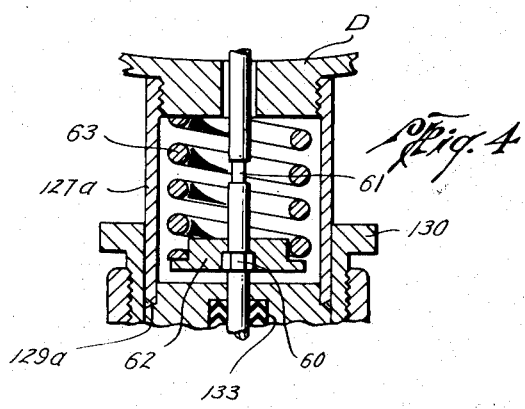

Patented Jan. 12, 1954

2,665,711

UNITED STATES PATENT OFFICE 2,665,711

FLUID MOTOR VALVE

Asbury S. Parks, Houston, Tex.

Application November 30, 1951, Serial No. 259,224

12 Claims. (Cl. 137—688)

This invention relates to new and useful improvements in fluid motor valves.

This application is filed as a continuation-in-part of my co-pending application, Serial No. 46,598, filed August 28, 1948, and as an improvement on my co-pending application, Serial No. 788,997, filed December 1, 1947.

The invention relates particularly to motor valve devices which are utilized to control the flow of a pressure fluid through a flow conductor and wherein the valve seat of the device is subjected to abrasion by the flowing pressure fluid.

An important object of the invention is to provide an improved valve device wherein the valve seat is so mounted within the valve housing that said seat may be quickly and easily removed and replaced without the necessity of disassembling the entire valve, the valve seat and its associated retaining elements which hold said seat in place being insertable and removable through a single relatively large access opening formed in the valve housing.

Another object is to provide a valve device wherein the valve seat is not threaded within the support but is merely disposed therein and held in position by a readily removable retaining assembly whereby freezing of the valve seat in position within the valve, which may result in requiring discarding of the entire valve housing, is obviated.

Still another object is to provide a valve, of the character described, which is so constructed that the valve seat, its retaining assembly and the valve stem may be efficiently sealed against pressures whereby the valve is adaptable for use in controlling the flow of high pressure fluids.

A further object is to provide a valve device which lends itself to combination with any type of motor or diaphragm arrangement; the valve seat assembly being such that it is readily adaptable to a simple one way valve controlling flow through a single passage or to multiple-passage valves which control flow through a plurality of passages.

Still another object is to provide a motor valve having a diaphragm-actuated valve element with the diaphragm assembly being constructed to operate the valve element with a snap action.

A further object is to provide a valve device, of the character described, having a pressure-responsive member controlling the operation of the valve; said pressure-responsive member having only a portion of its cross-sectional area exposed to the operating pressure until said operating pressure reaches a predetermined point, after which substantially the entire cross-sectional area of the member is exposed to the pressure to produce a sudden or snap action operation of the valve.

The construction designed to carry out the invention will be hereinafter described together with other features thereof.

Figure 2:
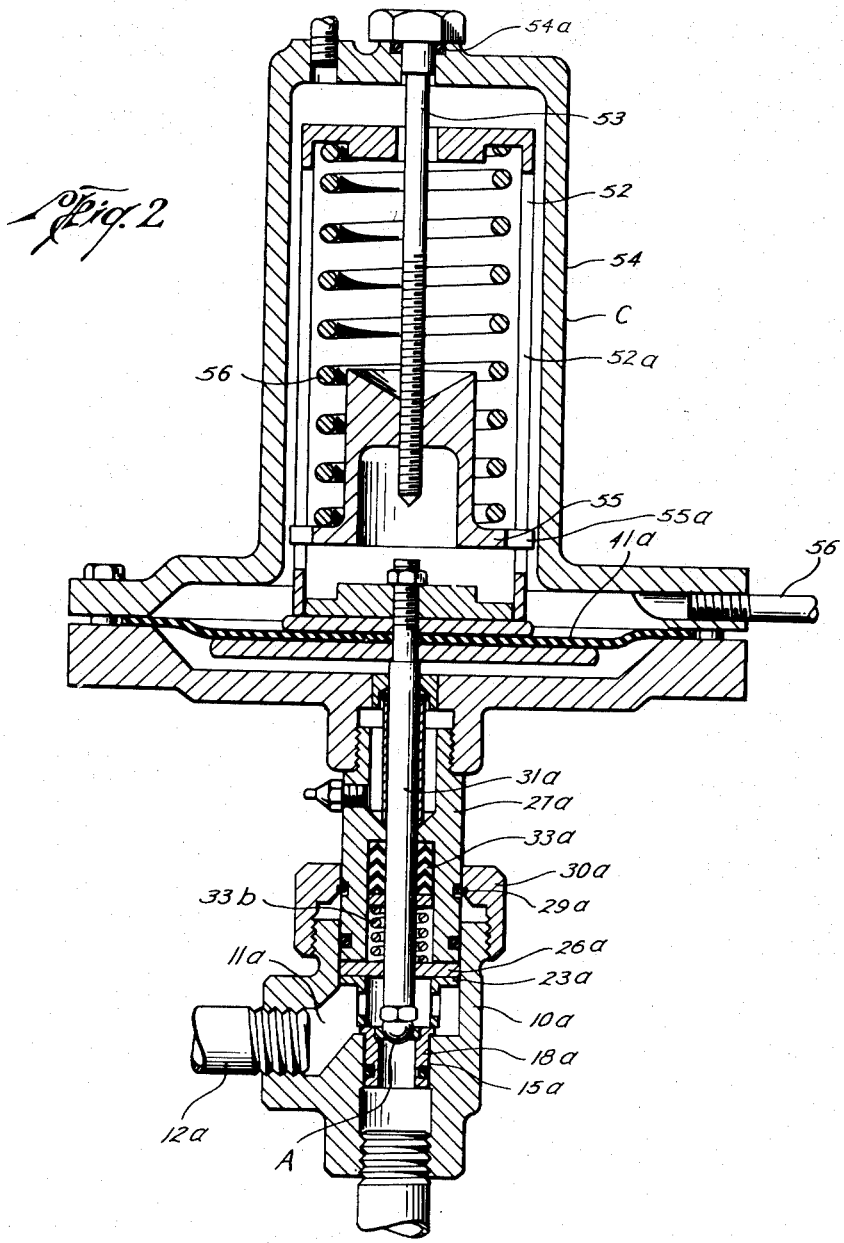

The invention will be more readily understood from a reading of the following specification and by reference to the accompanying drawings forming a part thereof, wherein an example of the invention is shown, and wherein:

Figure 1 is a transverse vertical sectional view of a motor valve device constructed in accordance with the invention, Figure 2 is a transverse vertical sectional view of a modified form of the invention, Figure 3 is a transverse vertical sectional view of still another form of the invention and illustrating the main valve element as spring-opening, and Figure 4 is a detail sectional view illustrating reversal of the spring in the form shown in Figure 3 to make the valve spring-closing.

In the drawings (Figure 1) the numeral 10 designates a valve body having an axial passage 11 extending therethrough. The ends of the passage are internally screw-threaded whereby the valve body may be connected in a flow line or conductor 12. A partition 13 is disposed centrally within the axial passage 11 and is supported therein by integral web elements 14, and this partition has an opening 15 formed therein. The valve body is provided with a relatively large access opening 16 which is in axial alignment with the opening 15 in the partition 13 and the access opening has an externally threaded collar 17 surrounding its upper end.

A valve seat member 18 having an external outwardly directed flange 19 is engageable within the opening 15, the flange limiting downward movement of the member within said opening. The valve seat member has a sliding engagement with the opening 15, and the joint therebetween is packed off by a suitable sealing ring, such as an O-ring 20, which is mounted in the exterior of the member 18 and which engages the wall of the opening. The member 18 has an axial flow port 21 extending entirely therethrough and an annular valve seat 22 is provided at the upper end of this port. The particular mounting of the valve seat member eliminates the use of a threaded connection between said member and the partition whereby insertion and removal of the seat member is facilitated. For retaining the seat member in position a retaining collar 23 has its lower end engageable with the upper surface of said member. This collar is provided with an annular flange 24 at its upper end, which flange has an external diameter substantially equal to the diameter of the access opening 16. Radial flow ports 25 are formed in the wall of the retaining collar 23 so that a free flow between the interior and the exterior thereof may occur. A plate 26 rests upon the upper end of the flange 24 of the retaining collar 23, and said plate is of substantially the same diameter as the access opening 16. A sleeve or annular body 27 also having a diameter substantially equal to the access opening 17 has its lower end engaging the plate member and the lower external portion of the sleeve is grooved to receive a sealing ring 28 which may be an O-ring whereby an effective seal between the sleeve and the valve body is had. An annular abutment 29 is provided on the exterior of the sleeve nearer its lower portion and, as shown, this abutment is formed by an annular ring which is mounted within an external groove in the sleeve. A flanged cap member 30 engages the abutment 29 and has its lower portion formed with internal threads which are engageable with the threaded collar 17 formed on the upper end of the valve body. It will be evident that when the cap member 30 is tightened down its engagement with the abutment 29 of the sleeve will urge the sleeve downwardly into contact with the plate 26 and the plate will in turn be urged into contact with the retaining collar 23, whereby said retaining collar is held in tight engagement with the valve seat member to hold the latter in position.

When the cap member 30 is disconnected from the collar 17, the sleeve 27 may be merely lifted from within the access opening, after which the plate 26, collar 23 and valve seat member 18 may also be readily removed from the valve body. Since there are no screw threads on any of the parts within the body, the danger of any of these parts freezing within the valve body is substantially eliminated. Thus, the valve seat member 18 may be readily removed and replaced when conditions require.

For controlling the flow through the passage 11 of the valve body and past the valve seat 22, a main valve element A is adapted to engage said seat. The valve element is mounted on the lower end of an elongate valve stem 31 which extends axially upwardly through an axial opening in the plate 26 and through the sleeve or body 27. Intermediate its ends the body or sleeve 27 is formed with a transverse partition 32 having a central opening through which the stem 31 projects. Below the partition a lip-type or other packing element 33 surrounds the valve stem and functions to seal off therearound. Above the partition the sleeve or body provides a lubricant chamber 34 within which a suitable lubricant may be introduced. A relatively thin sleeve 35 is confined loosely on the stem 31 within the lubricant chamber 34, and as the valve stem reciprocates during operation of the valve, the sliding movement of the stem through the sleeve 35 functions to maintain a film of lubricant on the stem and to carry lubricant to an O-ring packing 40 above the sleeve.

An operating diaphragm assembly generally indicated at B is mounted above the sleeve or body 27 and includes a diaphragm case 36 having a depending connecting collar 37 arranged to be threaded onto the upper end of the sleeve or body 27. The diaphragm case is formed with an axial bore 38 which communicates with the lubricant chamber and above this bore the diaphragm case is formed with an enlarged chamber 39. The O-ring packing 40 packs off around the stem at the upper end of the bore 38. The upper end of the valve stem 31 projects upwardly through the chamber 39 and has connection with an operating diaphragm 41. The peripheral portion of the operating diaphragm is clamped between the lower section 36a of the case 36 and an upper cover section 36b of said case. Obviously, movement of the diaphragm will impart similar movement to the valve element A so that said diaphragm controls operation of said valve element.

A headed bolt 42 has its lower end threaded onto the upper end of the operating stem and the head of this bolt functions to retain a follower 43 in engagement with the upper end of the operating diaphragm 41. The follower 43 has an annular rim or flange 44 which is in contact with the upper surface of the diaphragm. A predetermined downward force is exerted upon the operating diaphragm through the follower 43 by a coil spring 45 which engages an external shoulder 46 on the follower; the upper end of the spring is in engagement with a plate 47 and an adjusting screw 48 contacts the central portion of the plate. By adjusting the screw 48 the tension of the spring may be varied to exert a predetermined downward pressure on the operating diaphragm.

For conducting pilot operating pressure to the under side of the diaphragm to move the same upwardly against tension of the spring 45, an inlet port 49 is drilled through the lower section 36a of the diaphragm case 36, and this port is disposed in a position beyond the point of contact between the annular rim 44 of the follower with the operating diaphragm. An inlet conductor 50 is conducted to the port 49 and conducts pilot operating pressure to the port and against the under side of the operating diaphragm.

In the operation of the diaphragm assembly the spring 45 is adjusted to exert a predetermined pressure downwardly upon the diaphragm. Because the spring is acting upon the follower 43 the pressure is transmitted through the follower and is exerted upon the diaphragm by the annular rim or flange 44 so that maximum downward pressure upon the diaphragm is along this annular path. As pilot operating pressure is directed to the port 49, this pressure acts upon that section of the under side of the diaphragm which is between the annular rim or flange 44 and the outer margin of the diaphragm. This is true because the annular rim is exerting a pressure upon the upper surface of the diaphragm which will prevent the pressure from port 45 passing to the central portion of the under side of the diaphragm. As the pilot operating pressure is increased, the outer marginal portion of the diaphragm will be first deflected upwardly as shown by the dotted lines C in Figure 1, after which continued application of pressure will overcome the force of the spring 45 which is holding the annular rim 44 in contact with the diaphragm. As soon as this occurs the under side of the diaphragm will be lifted off of the upper surface 51 of the lower section of the diaphragm case, which surface functions as a seating surface, and this will allow pressure to act upon the full cross-sectional area of the operating diaphragm. It will be evident that the sudden increase of cross-sectional area of the diaphragm being exposed to the pilot operating pressure will cause the diaphragm to snap upwardly so that a snap action of the valve element A will occur. When the pilot pressure decreases to a predetermined point in accordance with the force of the spring 45, said diaphragm is returned to the position shown in full lines in Figure 1, at which time the valve element is seated.

In order to allow a limited movement of the central portion of the diaphragm and the valve A with respect to the follower 43, a relatively light coil spring 53 is confined between the diaphragm and the follower. The provision of this spring assures that the follower rim 44 will efficiently seat upon the upper surface of the diaphragm at the time that valve A engages its seat. The spring 53 provides a compensating means which eliminates the necessity of holding very close tolerances during manufacture.

From the foregoing, it will be seen that a valve device is provided having an improved manner of mounting the valve seat. The sleeve or body 27 which retains the valve seat in position is connected in position by the single retaining member 30. Merely by disengaging this retaining member it is possible to remove the entire assembly from the valve body 10. The retaining body or sleeve also functions as the support for the diaphragm case which simplifies the construction and eliminates separate supporting means for the diaphragm assembly B. The particular diaphragm assembly B shown in Figure 1 provides an arrangement which will permit opening of the main valve element with a snap action and this type of action is particularly advantageous in liquid dump valves.

In Figure 2 a modified form of the invention is shown illustrating the valve seat assembly applied to another type of valve body. In this instance, the valve body 10a has an angular passage 11a connected with a flow conductor 12a. A valve seat 18a is mounted within an opening 15a and is held in place by a flanged retaining collar 23a, plate 26a and sleeve or body 27a. A cap member 30a is adapted to thread on the upper end of the body and engages an abutment 29a formed on the sleeve or body 27a. In place of the lip type packing 33 a chevron type packing 33a is shown surrounding the stem within the lower portion of the sleeve or body 27a and a spring 33b maintains the packing in sealing position.

In this form of the invention the sleeve or body 27a has a different type of operating diaphragm unit C mounted thereon. This unit includes an operating diaphragm 41a which has its upper end secured to a yoke 52 having the yoke arms 52a. An adjusting screw 53 extends downwardly through the bonnet 54 of the unit C being suitably packed off by an O-ring 54a, and has a supporting member 55 threaded onto its lower end; the member 55 is formed with radial lugs 55a which abut the yoke arms 52a to prevent rotation of the member 55 when the screw 53 is adjusted. A coil spring 56 is confined between the upper closed end of the sleeve 52 and the supporting member 55 and exerts its pressure to urge the diaphragm upwardly. Pilot fluid operating pressure is conducted to the upper side of the diaphragm through a suitable conductor 56. It is obvious that the adjustment of the spring will control the amount of pressure required to actuate the valve element A which is secured to the lower end of the valve stem 31a. This type of motor valve is a direct operating type with the pilot pressure opposing the spring pressure.

In Figures 3 and 4 still another form of the invention is shown wherein the invention is illustrated as applied to a three-way valve. In this instance, a valve body 110 is provided with passages 111, 111a and 111b. An annular valve seat member 118 is mounted within the body and is retained on its seat by a retaining collar 123 having radial openings 125. A second valve seat member 118a rests upon the collar 123 and above this seat is a second retaining collar 123a. Suitable O-rings 120 seal off between the valve seats and the valve body. An annular block 127 is insertable within the access opening 116 in the valve body and engages the upper retaining collar to hold the assembly in place. A sleeve 127a extends upwardly from the block 127 and has the diaphragm case D secured to its upper end. A retaining collar or gland 130 threads into the access opening 116 and engages an external shoulder 129a on the block 127. It is thus evident that when the member or gland 130 is disconnected from the valve body 110 the complete valve assembly may be readily removed through the access opening.

A valve element A' is movable between the valve seats 118 and 118a and is secured to a valve stem 131. This stem extends upwardly through the block 127, through the sleeve 127a and has its upper end connected to the operating diaphragm 141 of the unit D. A suitable packing 133 packs off around the stem.

As shown in Figure 4, the stem 131 is formed with an annular recess 60 and a similar recess 61 spaced from the first recess, these recesses being located within the sleeve 127a. A flanged collar 62 may be connected to either of the recesses 60 or 61 and as shown in Figure 3 the collar is connected with the recess 60. A coil spring 63 is confined between the collar 62 and the upper end of the block 127 and exerts its pressure to urge the valve stem in an upward direction.

If it is desired to reverse the direction of force of the spring, it is only necessary to reverse the collar 62 and connect it to the lower recess 61. The coil spring 63 is then confined between the collar 62 and the under side of the diaphragm case of the unit D whereby the spring functions to urge the valve stem in a downward direction.

In all forms of the invention the valve seat is retained in place without the provision of any threads within the interior of the valve body which are exposed to the fluids flowing through said body. A single element such as the cap members of the form shown in Figures 1 and 2 or the gland of Figure 3 functions to retain the entire assembly in position. By removal of this single element the assembly may be readily removed so that the valve seat thereof may be replaced. The member which retains the valve seat in place, which is the body or sleeve 27 in Figure 1, the body 27a in Figure 2, and the block 127 and sleeve 127a in Figure 3, also functions to support the operating diaphragm assembly. As is clearly shown from the disclosure herein, any type of operating diaphragm unit may be employed for controlling operation of the valve element.

The foregoing disclosure and description of the invention is illustrative and explanatory thereof and various changes in the size, shape and materials, as well as in the details of the illustrated construction, may be made, within the scope of the appended claims, without departing from the spirit of the invention.

Having described the invention, I claim:

1. A motor valve device including, a valve housing having a valve seat support provided with an opening therein, said housing also having an access opening in alignment with the opening in the valve seat support, an annular valve seat member insertable through the access opening and having a sliding fit mounting within the opening in the valve seat support, a retaining assembly also insertable through the access opening and having its inner end engageable with the valve seat member to maintain said member in position within the opening in the valve seat support, said assembly including a tubular body extending outwardly from the access opening, means engageable with the body and attached to the valve housing for securing the retaining assembly within the housing, a valve element movable with respect to the valve seat, a valve stem on the valve element extending axially through the retaining assembly with its outer end projecting beyond the body, a casing secured directly to the outer end of the tubular body of the retaining assembly, and a pressure responsive element within said casing and having the projecting end of the valve stem secured thereto.

2. A motor valve device as set forth in claim 1, wherein the tubular body of the retaining assembly has an external diameter substantially equal to the diameter of the access opening, and a seal ring between said body and the wall defining said access opening.

3. A motor valve device as set forth in claim 1, together with a sealing means between the valve seat member and the opening in the valve seat support, a second sealing means between the retaining assembly and the access opening in the valve housing, and a third sealing means between the valve stem and the retaining assembly.

4. A motor valve device as set forth in claim 1, wherein the means for securing the retaining assembly within the housing comprises a securing collar which surrounds the body of the retaining assembly and engages an abutment thereon, said collar having threaded engagement with the valve housing.

5. A motor valve device as set forth in claim 1, wherein the retaining assembly includes a retaining collar adapted to engage the valve seat and a retaining plate engageable with the collar, the tubular body of the assembly contacting the plate to complete the assembly.

6. A motor valve device as set forth in claim 1, together with a lubricant reservoir in the body of the retaining assembly through which the valve stem extends, and a tubular sleeve slidably mounted within limits on the valve stem within said reservoir.

7. A motor valve device including, a valve housing having a valve seat support provided with an opening therein, said housing also having an access opening in alignment with the valve seat support, a valve seat member having a sliding fit mounting within the opening of the support, a retaining assembly extending through the access opening and engaging the valve seat to maintain it in position within the valve seat support, a valve element movable relative to the seat and having a valve stem projecting axially through the retaining assembly, a pressure-responsive diaphragm case secured directly to the outer end of the retaining assembly, a diaphragm within the support having the valve stem secured thereto, and means for actuating the diaphragm with a snap action to actuate the valve with a similar action.

8. A motor valve device including, a valve housing having a valve seat support provided with an opening therein, said housing also having an access opening in alignment with the valve seat support, a valve seat member having a sliding fit mounting within the opening of the support, a retaining assembly extending through the access opening and engaging the valve seat to maintain it in position within the valve seat support, a valve element movable relative to the seat and having a valve stem projecting axially through the retaining assembly, a pressure-responsive diaphragm case secured directly to the outer end of the retaining assembly, a diaphragm within the support having the valve stem secured thereto, an annular follower engaging one side of the diaphragm, spring means acting on said diaphragm to urge the follower into engagement with the diaphragm, and means for directing an operating pressure fluid against that side of the diaphragm opposite the follower and at a point outside of the annular line of engagement of the follower with said diaphragm.

9. A motor valve device including, a valve housing having a valve seat support provided with an opening therein, said housing also having an access opening in alignment with the valve seat support, a valve seat member having a sliding fit mounting within the opening of the support, a retaining assembly through the access opening and engaging the valve seat to maintain it in position within the valve seat support, a valve element movable relative to the seat and having a valve stem projecting axially through the retaining assembly, a pressure-responsive diaphragm case secured directly to the outer end of the retaining assembly, a diaphragm within the support having the valve stem secured thereto, an annular seating surface within the diaphragm, an annular follower of lesser diameter than the diaphragm and engaging the opposite end of the diaphragm, spring means acting upon the follower to maintain the follower in engagement with the diaphragm and to urge the diaphragm against the annular seat, and means for directing the pressure fluid against that side of the diaphragm opposite the side engaged by the follower and at a point outside the annular line of engagement between the follower and the diaphragm.

10. A motor valve device including, a valve housing having a valve seat support provided with an opening therein, said housing also having an access opening in alignment with the valve seat support, a valve seat member having a sliding fit mounting within the opening of the support, a retaining assembly extending through the access opening and engaging the valve seat to maintain it in position within the valve seat support, a valve element movable relative to the seat and having a valve stem projecting axially through the retaining assembly, a pressure-responsive diaphragm case secured directly to the outer end of the retaining assembly, a diaphragm within the support having the valve stem secured thereto, spring means acting on the diaphragm and valve stem for urging the valve element toward open position, said valve housing having an angular passage with the valve seat support therein, and chevron type packing sealing off around the valve stem within the retaining assembly.

11. A motor valve device including, a valve housing having a valve seat support provided with an opening therein, said housing also having an access opening in alignment with the valve seat support, a valve seat member having a sliding fit mounting within the opening of the support, a retaining assembly extending through the access opening and engaging the valve seat to maintain it in position within the valve seat support, a valve element movable relative to the seat and having a valve stem projecting axially through the retaining assembly, a pressure-responsive diaphragm case secured directly to the outer end of the retaining assembly, a diaphragm within the support having the valve stem secured thereto, said retaining assembly including a tubular body and said valve stem having a pair of spaced recesses thereon which are located within the bore of the body nearer the upper and lower ends thereof, a collar adapted to be secured to one or the other of the recesses to dispose said collar on the stem in a desired position within the tubular body, and spring means adapted to be confined between said collar and the diaphragm case or between the collar and the retaining assembly, depending upon the position of the collar on the stem.

12. A motor valve device as set forth in claim 11, wherein a second valve seat member is interposed between the first valve seat member and the retaining assembly and also wherein the valve element is arranged to engage one or the other of said valve seats.

ASBURY S. PARKS.

References Cited in the file of this patent

UNITED STATES PATENTS

| Number | Name | Date |
|---|---|---|
| 1,074,379 | Pasman | Sept. 30, 1913 |
| 1,135,579 | Hansen | Apr. 13, 1915 |
| 2,070,661 | Hughes | Feb. 16, 1937 |